(12) United States Patent
Stanke et al.

(10) Patent No.: US 7,607,313 B2
(45) Date of Patent: Oct. 27, 2009

(54) VEHICLE HVAC SYSTEM

(75) Inventors: Edwin J. Stanke, Pontiac, MI (US); Gregory A. Major, Farmington Hills, MI (US); William R. Hill, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 306 days.

(21) Appl. No.: 11/610,552

(22) Filed: Dec. 14, 2006

(65) Prior Publication Data

US 2008/0141688 A1 Jun. 19, 2008

(51) Int. Cl.
*F25B 49/00* (2006.01)

(52) U.S. Cl. .............................. 62/197; 62/149; 62/173

(58) Field of Classification Search ..................... 62/77, 62/129, 159, 173, 196.4, 149
See application file for complete search history.

(56) References Cited

U.S. PATENT DOCUMENTS

| | | | | | |
|---|---|---|---|---|---|
| 5,605,051 | A | * | 2/1997 | Iritani et al. | 62/160 |
| 5,706,664 | A | * | 1/1998 | Hara | 62/159 |
| 6,125,643 | A | * | 10/2000 | Noda et al. | 62/196.4 |
| 6,834,511 | B2 | * | 12/2004 | Hatakeyama | 62/173 |

* cited by examiner

*Primary Examiner*—Frantz F Jules
*Assistant Examiner*—Emmanuel Duke

(57) ABSTRACT

A HVAC system and method for a vehicle is disclosed. The air conditioning portion of the HVAC system may be able to store and release refrigerant in charge bottle while operating in an air conditioning mode. The air conditioning portion of the HVAC system may be able to employ the refrigerant flowing through the evaporator to provide supplemental heat.

20 Claims, 3 Drawing Sheets

# VEHICLE HVAC SYSTEM

BACKGROUND OF THE INVENTION

The present application relates generally to a heating ventilating and air conditioning (HVAC) system for a vehicle.

Conventional vehicle HVAC systems have a refrigeration circuit and a heating circuit. The conventional refrigeration circuit includes a compressor, which compresses the refrigerant and sends it through to a condenser, where heat is removed from the refrigerant. The refrigerant then flows through an expansion device, dropping the temperature further, before it enters an evaporator in an HVAC module of a passenger compartment. The evaporator absorbs heat from air flowing through it before the air flows into the passenger compartment. The refrigerant then flows from the evaporator back into the compressor to start the process over again. The conventional heating circuit employs a heater core in the HVAC module in the passenger compartment, where hot coolant from the engine cooling system flows through it to heat the air before it flows into the passenger compartment.

The refrigeration circuit has drawbacks in that, for refrigerant systems employing expansion valves and receiver dryers, storing the refrigerant above a critical charge by subcooling is required. The refrigerant storage occurs in the condenser, which increases the pressure drop in the system and thus reduces the condenser capacity. This results in reduced system efficiency.

The heating circuit has drawbacks in that the heater core cannot provide heat to the air flowing through it until the engine has time to warm up the coolant. This becomes even more of a concern as modern engines become more efficient, thus producing less excess heat to warm up the engine coolant. Electric powered heaters can be provided for supplemental heating while the coolant warms up. However, this electric heat may not be very energy-efficient and may further burden the vehicle electrical system that may be operating near its capacity in the first place.

Thus, it is desirable to provide an HVAC system for a vehicle that may provide heating or air conditioning in a more efficient or timely manner.

SUMMARY OF THE INVENTION

An embodiment contemplates a vehicle HVAC system having an air conditioning portion that may include a compressor, a condenser operatively engaging a refrigerant output from the compressor, an evaporator, and an expansion device operatively engaging a refrigerant output from the condenser and a refrigerant input to the evaporator. The embodiment may also include a charge bottle selectively connectable to the refrigerant output from the condenser.

An embodiment contemplates a method of operating a vehicle HVAC system having an air conditioning portion with a main refrigerant loop, the method comprising the steps of: determining if air conditioning is desired; determining if a refrigerant charge is too high; determining if a refrigerant charge is too low; opening a refrigerant outflow valve, located between a refrigerant output of a condenser and a charge bottle, to remove some of the refrigerant charge from the main refrigerant loop and store it in the charge bottle, if determined that air conditioning is desired and the refrigerant charge is too high; and opening a refrigerant inflow valve, located between a refrigerant input of an evaporator and the charge bottle, to add some of the refrigerant charge from the charge bottle into the main refrigerant loop, if determined that air conditioning is desired and the refrigerant charge is too low.

A method of operating a vehicle HVAC system having an air conditioning portion with a main refrigerant loop, the method comprising the steps of: determining if supplemental heat is desired; directing a refrigerant from a refrigerant output of a compressor into a refrigerant input to an evaporator, bypassing a condenser and an expansion device, if determined that supplemental heat is desired; determining if air conditioning is desired; and directing a refrigerant from the refrigerant output of the compressor into a refrigerant input of the condenser, and from a refrigerant output of the condenser through an expansion device into the refrigerant input of the evaporator, if determined that air conditioning is desired.

An advantage of an embodiment may be overall improved operating efficiency of the refrigerant system, which may allow for less power consumption. The effective condenser capacity may be maximized, minimizing the pressure drop across the condenser.

An advantage of an embodiment may be improved stability in charge sensitive systems since the appropriate valve can be opened for short durations when there is excess or insufficient compressor mass flow capacity.

An advantage of an embodiment may be to provide the capability to store reserve cooling charge for short durations.

An advantage of an embodiment may be the ability of the air conditioning portion of the HVAC system to provide supplemental heating.

DETAILED DESCRIPTION

Figure 1:
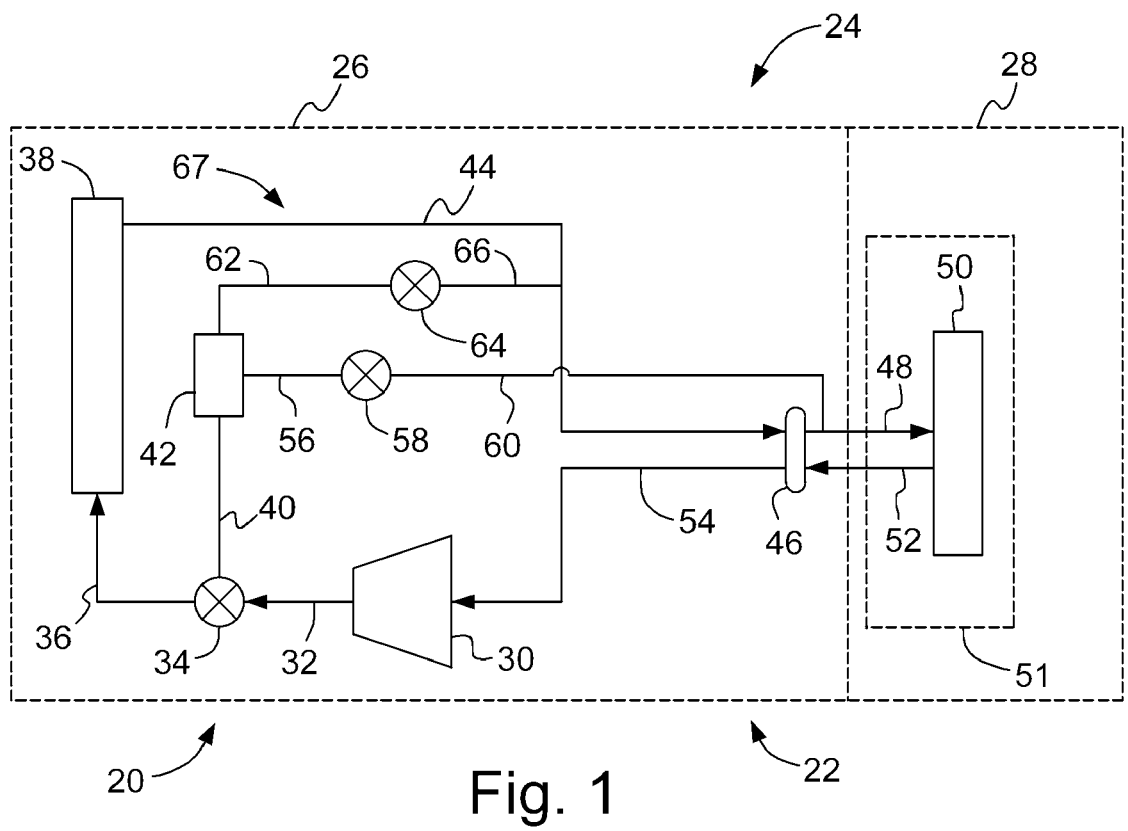
FIG. 1 is a schematic diagram of an air conditioning system, with a refrigerant flow path shown for a standard air conditioning operating mode.

FIG. 1 illustrates a schematic diagram of an air conditioning portion 20 of an HVAC system 22 for a vehicle 24, with a refrigerant flow path shown for a standard air conditioning operating mode. The refrigerant lines with arrows in FIGS. 1 and 3-5 indicate the direction of refrigerant flow for the particular operating mode illustrated in that figure, while refrigerant lines without arrows indicate no refrigerant flow through those lines for that particular operating mode.

The air conditioning portion 20 may be partially in an engine compartment 26 and partially in a passenger compartment 28 of the vehicle 24. A compressor 30—typically driven by a vehicle engine (not shown)—compresses the refrigerant, which then travels from a refrigerant output of the compressor 30 through a refrigerant line 32 to a three-way valve 34. The three-way valve 34 connects to a refrigerant line 36 leading to a refrigerant input to a condenser 38 and to a refrigerant line 40 leading to a charge bottle 42. The three-way valve 34 is electrically operable to switch the flow between refrigerant line 36 and refrigerant line 40. A refrigerant line 44 extends from a refrigerant output of the condenser 38 to a thermostatic expansion valve 46. A refrigerant line 48 extends from the expansion valve 46 to a refrigerant input to an evaporator 50, located in an HVAC module 51 in the passenger compartment 28, and another refrigerant line 52 extends from a refrigerant output of the evaporator 50 to the expansion valve 46. Refrigerant line 54 extends from the expansion valve 46 to a refrigerant input to the compressor 30.

The expansion valve 46 has a variable orifice that controls the amount of refrigerant flowing into the evaporator 50, with the orifice controlled by the pressure and temperature of the refrigerant leaving the evaporator 50. This is why the expansion valve 46 is in communication with the refrigerant at both the inlet and outlet to the evaporator 50.

The air conditioning portion 20 of the HVAC system 22 also includes a pair of valves that can be automatically opened and closed to selectively allow flow to and from the charge bottle 42. A refrigerant line 56 extends from the charge bottle 42 to a refrigerant inflow valve 58, and another refrigerant line 60 extends from the refrigerant inflow valve 58 to the inlet to the evaporator 50. Refrigerant line 62 extends from the charge bottle 42 to a refrigerant outflow valve 64, and another refrigerant line 66 extends from the refrigerant outflow valve 64 to refrigerant line 44. The term inflow is used relative to valve 58 to indicate that refrigerant flows from the charge bottle 42 back into the main refrigerant loop 67 when the inflow valve 58 is open. The term outflow is used relative to valve 64 to indicate that refrigerant flows out from the main refrigerant loop 67 into the charge bottle 42 when the outflow valve 64 is open.

The refrigerant flow path, as indicated by the arrows in FIG. 1, results from the three-way valve 34 being positioned to direct flow to the condenser 38, and both the inflow and outflow valves 58, 64 being closed. This is the refrigerant flow path for a standard air conditioning operating mode. One will note that, in this operating mode, there is no flow into or out of the charge bottle 42—all of the flow is through the main refrigerant loop 67.

Figure 2:
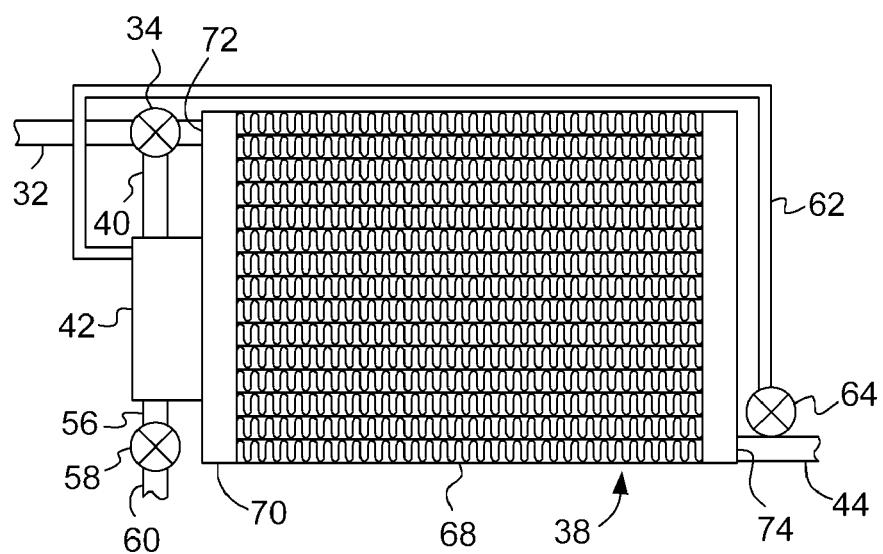
FIG. 2 is a schematic diagram of a portion of the air conditioning system of FIG. 1.

FIG. 2 illustrates a possible packaging arrangement for a portion of the HVAC system 22 illustrated in FIG. 1. While other packaging arrangements for the components shown in FIG. 1 can be used, this packaging arrangement may provide for a relatively compact and easy to install assembly. The arrangement described in FIG. 2 has many items in common with that of FIG. 1 and to avoid unnecessary repetition of the description, the same reference numerals have been used to refer to the same items, even if not specifically discussed relative to FIG. 2. The condenser 38 may include a heat exchanger core 68 and a condenser header 70. The charge bottle 42 may be mounted to the condenser header 70, with the three-way valve 34 and the refrigerant inflow valve 58 in close proximity thereto. The three-way valve 34 may be mounted close to the condenser refrigerant inlet 72, while the refrigerant outflow valve 64 may be mounted close to the condenser refrigerant outlet 74. While improving packaging, this arrangement also allows for the outlet of the charge bottle 42 leading to the refrigerant inflow valve 58 to be at the bottom of the charge bottle 42. This may avoid concerns with oil trapping.

Figure 3:
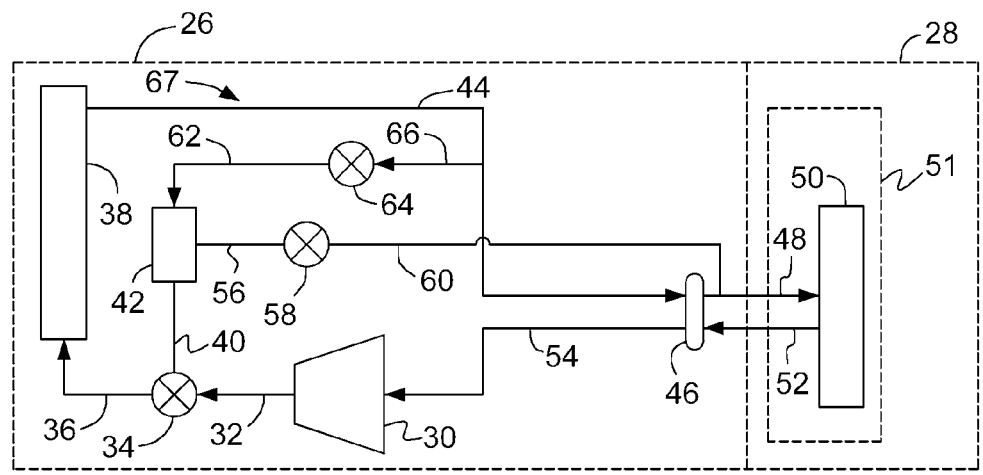
FIG. 3 is a schematic diagram similar to FIG. 1, but showing a refrigerant flow path when refrigerant is flowing from the main refrigerant loop into the charge bottle.

FIG. 3 is a schematic diagram similar to FIG. 1, but illustrating a refrigerant flow path when the HVAC system 22 is in the air conditioning operating mode and refrigerant is flowing from the main refrigerant loop 67 into the charge bottle 42. The arrangement described in FIG. 3 has the same elements shown as FIG. 1 and to avoid unnecessary repetition of the description, the same reference numerals have been used to refer to the same elements, even if not specifically discussed relative to FIG. 3. Removing some of the refrigerant charge from the main refrigerant loop 67 is accomplished by positioning the three-way valve 34 to direct flow through the condenser, leaving the refrigerant inflow valve 58 closed, and opening the refrigerant outflow valve 64 until the charge is corrected by removing the desired amount of refrigerant from the main refrigerant loop 67 and storing it in the charge bottle 42.

Figure 4:
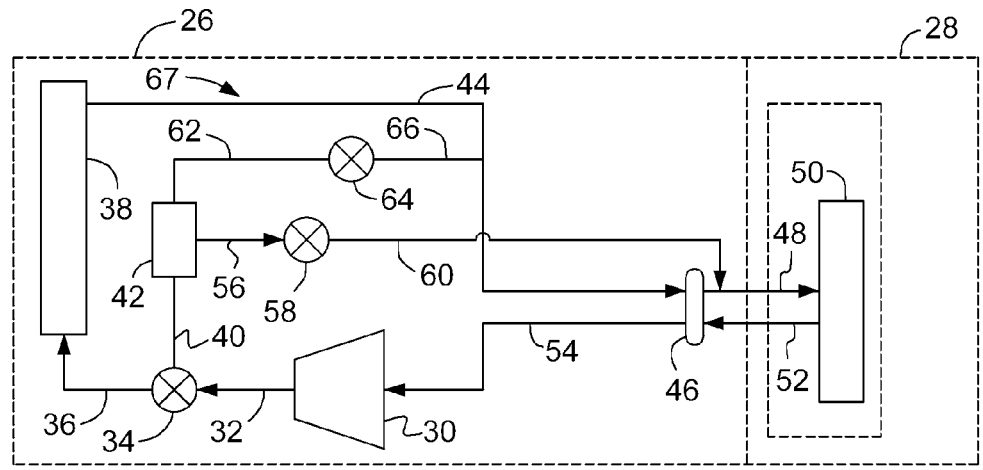
FIG. 4 is a schematic diagram similar to FIG. 1, but showing a refrigerant flow path when refrigerant is flowing from the charge bottle into the main refrigerant loop.

FIG. 4 illustrates a schematic diagram similar to FIG. 1, but illustrating a refrigerant flow path when the HVAC system 22 is in the air conditioning operating mode and refrigerant is flowing from the charge bottle 42 into the main refrigerant loop 67. The arrangement described in FIG. 4 has the same elements shown as FIG. 1 and to avoid unnecessary repetition of the description, the same reference numerals have been used to refer to the same elements, even if not specifically discussed relative to FIG. 4. Adding some refrigerant charge to the main refrigerant loop 67 is accomplished by positioning the three-way valve 34 to direct flow through the condenser, leaving the refrigerant outflow valve 64 closed, and opening the refrigerant inflow valve 58 until the charge is corrected by adding the desired amount of refrigerant stored in the charge bottle 42 to the main refrigerant loop 67.

Figure 5:
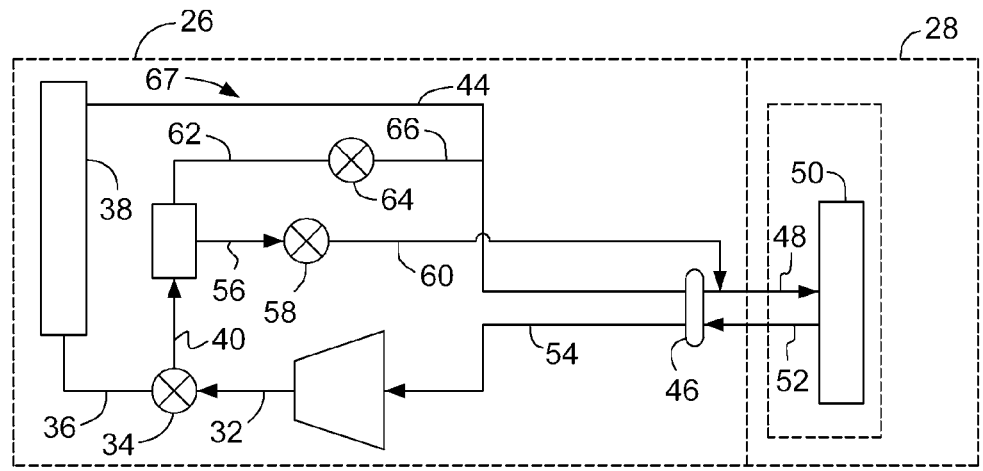
FIG. 5 is a schematic diagram similar to FIG. 1, but showing refrigerant flow paths for a supplemental heat operating mode.

FIG. 5 illustrates a schematic diagram similar to FIG. 1, but illustrating a refrigerant flow path when the HVAC system 22 is in a supplemental heat operating mode. The arrangement described in FIG. 5 has the same elements shown as FIG. 1 and to avoid unnecessary repetition of the description, the same reference numerals have been used to refer to the same elements, even if not specifically discussed relative to FIG. 5. Providing supplemental heat is accomplished by positioning the three-way valve 34 to direct the refrigerant into the charge bottle 42 rather than through the condenser 38, opening the refrigerant inflow valve 58 to receive refrigerant from the charge bottle 42 and direct it to the evaporator 50 (bypassing the expansion valve 46), and leaving the outflow valve 64 closed.

Figure 6:
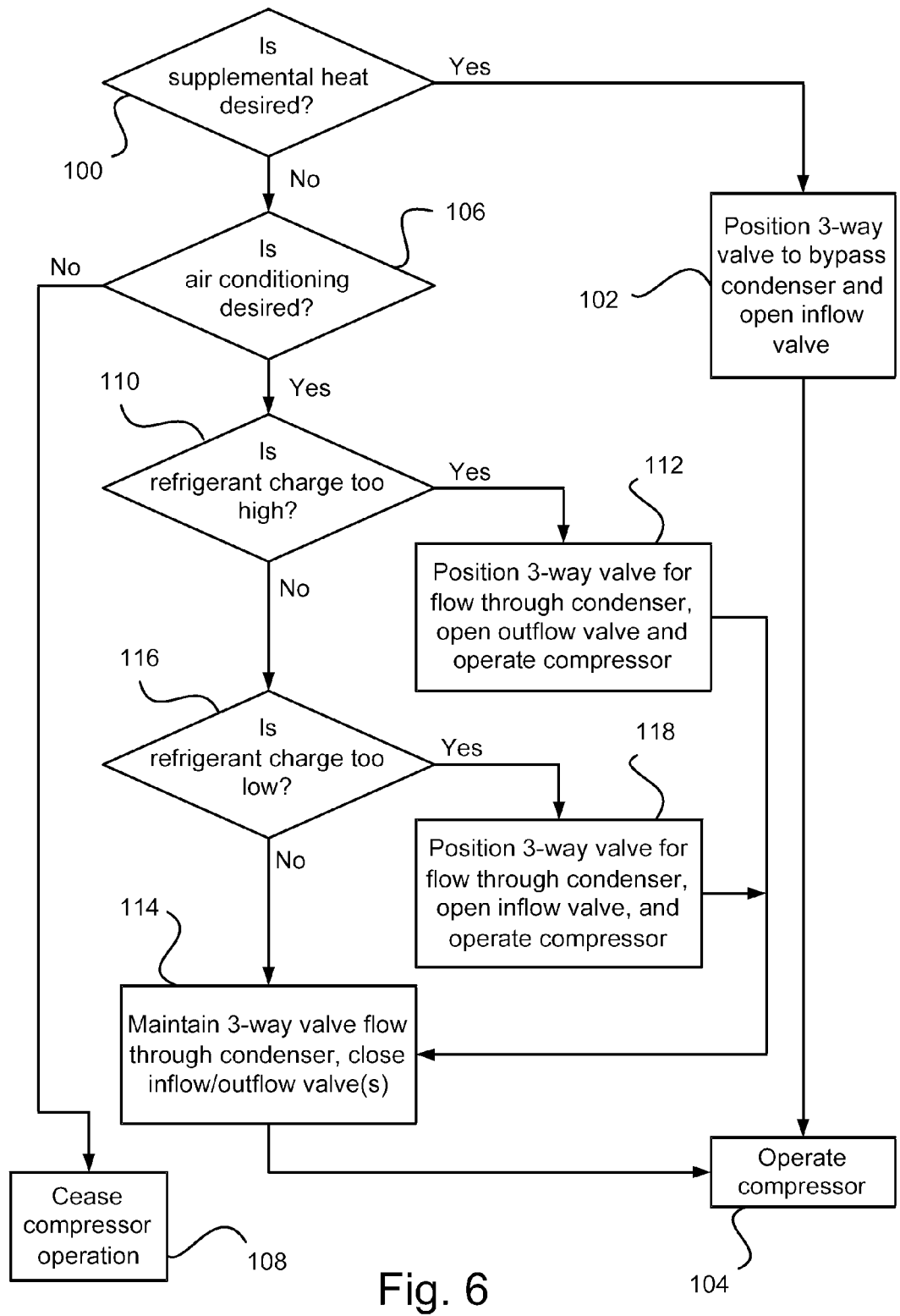
FIG. 6 is a flow chart illustrating an overall method for operating the air conditioning system.

FIG. 6 illustrates a possible method for operating the air conditioning system shown in FIGS. 1-5. A determination is made whether supplemental heat is desired, block 100. If it is, then the three-way valve 34 is positioned to bypass the condenser 38 and the refrigerant inflow valve 58 is opened, block 102, and the compressor 30 is operated, block 104. If supplemental heat is not desired, then a determination is made whether air conditioning is desired, block 106. If not, then compressor operation is ceased, block 108.

If air conditioning is desired, a determination is made whether the refrigerant charge is too high, block 110. If the refrigerant charge is too high, the three-way valve 34 is positioned for flow through the condenser 38, the refrigerant outflow valve 64 is opened, and the compressor 30 is operated while the refrigerant charge is reduced to the desired level, block 112. Once the refrigerant charge is reduced to the desired level, the three-way valve 34 is maintained for flow through the condenser 38, the outflow valve 64 is closed, block 114, and the compressor 30 continues to operate, block 104.

If the refrigerant charge is not too high, then a determination is made whether the refrigerant charge is too low, block 116. If the refrigerant charge is too low, the three-way valve 34 is positioned for flow through the condenser 38, the refrigerant inflow valve 58 is opened, and the compressor 30 is operated while the refrigerant charge is increased to the desired level, block 118. Once the refrigerant charge is increased to the desired level, the three-way valve 34 is maintained for flow through the condenser 38, the inflow valve 58 is closed, block 114, and the compressor continues to operate, block 104.

If the refrigerant charge is not too low, then the three-way valve 34 is maintained for flow through the condenser 38, both the inflow and outflow valves 58, 64 are left closed, block 114, and the compressor 30 is operated, block 104.

This method allows for maintaining a more desirable amount of refrigerant charge in the main refrigerant loop 67 during air conditioning operating mode, which may improve system efficiency at different ambient and evaporator load conditions. The improved system efficiency may reduce the work the compressor 30 does, which may improve vehicle fuel economy. In addition, the valves 34, 58 can be used to bypass the condenser 38, allowing the evaporator 50 to be used to provide supplemental heat.

An alternative to the system and method embodiments disclosed above may include, eliminating the charge bottle 42 and refrigerant outflow valve 64 from the HVAC system 22, and eliminating the method steps relating to increasing or decreasing the refrigerant charge in the main refrigerant loop 67. This will allow for operation in a standard air conditioning mode as well as a supplemental heat mode, but will eliminate the modes that add or remove refrigerant from the main refrigerant loop 67. Another alternative to the system and method embodiments disclosed above may include eliminating the three-way valve 34 from the HVAC system 22, and eliminating the method steps relating to providing supplemental heat. This will allow for a standard air conditioning operating mode, as well as the air conditioning operating modes that allow refrigerant charge to be removed from or added to the main refrigerant loop 67. An additional alternative embodiment to the HVAC system 22 disclosed above may include replacing the three-way valve 34 with two open/close only valves (not shown).

While certain embodiments of the present invention have been described in detail, those familiar with the art to which this invention relates will recognize various alternative designs and embodiments for practicing the invention as defined by the following claims.

What is claimed is:

1. A vehicle HVAC system having an air conditioning portion comprising:
   a compressor having a refrigerant output;
   a condenser having a refrigerant output and a refrigerant input;
   an evaporator having a refrigerant input;
   an expansion device operatively engaging the refrigerant output from the condenser and the refrigerant input to the evaporator;
   a charge bottle selectively connectable to the refrigerant output from the condenser;
   a valve assembly operatively engaging the refrigerant output from the compressor, the refrigerant input to the condenser and the charge bottle, the valve assembly configured to selectively direct a flow of the refrigerant from the refrigerant output of the compressor to one of the refrigerant input to the condenser and the charge bottle; and
   a refrigerant line extending between and directly connecting the valve assembly to the charge bottle.

2. The HVAC system of claim 1 including a refrigerant outflow valve, connected between the charge bottle and the refrigerant output from the condenser, and operable to be opened to allow a refrigerant flow into the charge bottle from the refrigerant output from the condenser and closed to prevent the refrigerant flow into the charge bottle from the refrigerant output from the condenser.

3. The HVAC system of claim 2 including a refrigerant inflow valve, connected between the charge bottle and the refrigerant input to the evaporator, and operable to be opened to allow the refrigerant flow from the charge bottle to the refrigerant input of the evaporator, bypassing the expansion device, and closed to prevent the refrigerant flow from the charge bottle.

4. The HVAC system of claim 1 including a refrigerant inflow valve, connected between the charge bottle and the refrigerant input to the evaporator, and operable to be opened to allow the refrigerant flow from the charge bottle to the refrigerant input of the evaporator, bypassing the expansion device, and closed to prevent the refrigerant flow from the charge bottle.

5. The HVAC system of claim 4 wherein the valve assembly is a three-way valve.

6. The HVAC system of claim 1 wherein the condenser has a header and the charge bottle is mounted to the header.

7. The HVAC system of claim 1 wherein the expansion device is a thermostatic expansion valve.

8. A method of operating a vehicle HVAC system having an air conditioning portion with a main refrigerant loop, the method comprising the steps of:
   (a) determining if air conditioning is desired;
   (b) determining if a refrigerant charge is too high;
   (c) determining if a refrigerant charge is too low;
   (d) opening a refrigerant outflow valve, located between a refrigerant output of a condenser and a charge bottle, to remove some of the refrigerant charge from the main refrigerant loop and store it in the charge bottle, if determined that air conditioning is desired and the refrigerant charge is too high; and
   (e) opening a refrigerant inflow valve, located between a refrigerant input of an evaporator and the charge bottle, to add some of the refrigerant charge from the charge bottle into the main refrigerant loop, if determined that air conditioning is desired and the refrigerant charge is too low.

9. The method of claim 8 further including the steps of:
   (f) determining if supplemental heat is desired;
   (g) directing a refrigerant output from a compressor into the charge bottle and opening the refrigerant inflow valve, if determined that supplemental heat is desired.

10. The method of claim 9 wherein step (d) is further defined by closing the outflow valve when refrigerant charge is no longer too high.

11. The method of claim 9 wherein step (e) is further defined by closing the inflow valve when the refrigerant charge is no longer too low.

12. The method of claim 8 wherein step (d) is further defined by closing the outflow valve when refrigerant charge is no longer too high.

13. The method of claim 8 wherein step (e) is further defined by closing the inflow valve when the refrigerant charge is no longer too low.

14. A method of operating a vehicle HVAC system having an air conditioning portion with a main refrigerant loop, the method comprising the steps of:
   (a) determining if supplemental heat is desired;
   (b) directing a refrigerant from a refrigerant output of a compressor into a refrigerant input to an evaporator, bypassing a condenser and an expansion device, if determined that supplemental heat is desired;
   (c) determining if air conditioning is desired; and (d) directing a refrigerant from the refrigerant output of the compressor into a refrigerant input of the condenser, and from a refrigerant output of the condenser through an expansion device into the refrigerant input of the evaporator, if determined that air conditioning is desired.

15. The method of claim 14 wherein steps (b) and (d) are further defined by providing a three-way valve between the refrigerant output of the compressor and the refrigerant input of the condenser.

16. The method of claim 14 further including the steps of (e) determining if a refrigerant charge is too high, and (f) opening a refrigerant outflow valve, located between the refrigerant output of the condenser and a charge bottle, to remove some of the refrigerant from the main refrigerant loop and store it in the charge bottle, if determined that air conditioning is desired and the refrigerant charge is too high.

17. The method of claim 16 further including the steps of (g) determining if a refrigerant charge is too low, and (h) opening a refrigerant inflow valve, located between the refrigerant input of the evaporator and the charge bottle, to add some of the refrigerant charge from the charge bottle into the main refrigerant loop, if determined that air conditioning is desired and the refrigerant charge is too low.

18. The method of claim 17 wherein steps (b) and (d) are further defined by providing a three-way valve between the refrigerant output of the compressor and the refrigerant input of the condenser.

19. The method of claim 14 further including the steps of (e) determining if a refrigerant charge is too low, and (f) opening a refrigerant inflow valve, located between the refrigerant input of the evaporator and the charge bottle, to add some of the refrigerant charge from the charge bottle into the main refrigerant loop, if determined that air conditioning is desired and the refrigerant charge is too low.

20. The method of claim 14 wherein step (b) is further defined by ceasing operation of the compressor if the supplemental heat is no longer desired.

* * * * *